US008921682B2

(12) United States Patent
Yang et al.

(10) Patent No.: US 8,921,682 B2
(45) Date of Patent: Dec. 30, 2014

(54) PHOTOVOLTAIC SYSTEM ABLE TO FLOAT ON WATER AND TRACK SUN

(75) Inventors: His-Hung Yang, Taipei (TW); Wei-Yang Ma, New Taipei (TW); Tsun-Neng Yang, Taipei (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 30 days.

(21) Appl. No.: 13/567,368

(22) Filed: Aug. 6, 2012

(65) Prior Publication Data
US 2014/0034110 A1 Feb. 6, 2014

(51) Int. Cl.
*H01L 31/042* (2014.01)
*G01S 3/786* (2006.01)

(52) U.S. Cl.
CPC ........... *H01L 31/0422* (2013.01); *G01S 3/7861* (2013.01)
USPC ........................................... 136/246; 136/251

(58) Field of Classification Search
CPC .................. H01L 31/0422; G01S 3/7861
USPC ......................................................... 136/246
See application file for complete search history.

(56) References Cited

U.S. PATENT DOCUMENTS

| 2006/0090789 | A1* | 5/2006 | Thompson | 136/246 |
| 2008/0000515 | A1* | 1/2008 | Lin et al. | 136/246 |
| 2008/0017472 | A1* | 1/2008 | Redelman et al. | 192/218 |
| 2011/0265873 | A1* | 11/2011 | Kim | 136/259 |

FOREIGN PATENT DOCUMENTS

WO  WO2011007986  * 1/2011

* cited by examiner

*Primary Examiner* — James Lin
*Assistant Examiner* — Dujuan Horton
(74) *Attorney, Agent, or Firm* — Jackson IPG PLLC

(57) ABSTRACT

A photovoltaic system able to float on water and track sun includes a floating mechanism; an adjusting mechanism, combining with the floating mechanism; and a solar power mechanism, combining with the adjusting mechanism and located above the floating mechanism. This photovoltaic system can be located on the water surface, and has its floating mechanism to be under water by using the adjusting mechanism and the surrounding water source. The adjusting mechanism can be further used to adjust the solar power mechanism to a specific tilt angle according to the water level of the surrounding water and the sun-tracking angles that varies as the locations of the sun. Therefore, a novel photovoltaic system with simplified configuration, accurate sun tracking and enhanced power generation efficiency can be achieved.

6 Claims, 3 Drawing Sheets

PHOTOVOLTAIC SYSTEM ABLE TO FLOAT ON WATER AND TRACK SUN

BACKGROUND OF THE INVENTION

1. Field of the Invention

The present invention relates to a photovoltaic system able to float on water and track sun's movement, and particularly to a photovoltaic system which can be located on the water surface, and has its floating mechanism to be under water by using the adjusting mechanism and the surrounding water source. The adjusting mechanism can be further used to adjust the solar power mechanism to a specific tilt angle according to the water level of the surrounding water and the sun-tracking angles that varies as the locations of the sun, so that the simplified configuration, accurate sun tracking and enhanced power generation efficiency can be achieved.

2. Description of Related Art

In recent years, alternative energy needs stimulates rapid growth in the development of renewable energy. The wind farm, hydroelectric power plant, thermal power station, and solar power plant need a certain area of land, which raises the cost and is against to the living environment and food productions as population in the world increases.

Solar energy is a clean and inexhaustible natural resource, and therefore solar power is the most promising renewable energy. However, if the solar power plant is expected to offer the same generating capacity and supply stability as the traditional power plant, then the required land area is probably the hundreds even thousands times of the traditional power plant.

Ocean accounts for about ¾ of the total area of the Earth. In order to efficiently use the land resources, the solar power should be moved to the ocean or lakes for the sake of making full use of the Earth's space, improving the utilization of land, expanding the human living space, and for other derived significant benefits, for example; lowering the water temperature, slowing down the greenhouse effect, reducing the evaporation of fresh water in the reservoirs and improving water quality in the reservoirs.

The advantages of the solar power plant build on water have drawn attention in recent years. Development and further application of the related technologies have been made. In terms of technology, it is not difficult to make the overall system float on the water. However, there is still a considerable space to improve to make good use of in situ environmental conditions and water resources while enhance the efficiency of the solar power plant and the water quality for creating a win-win situation.

An existing water solar power plant is mainly built directly on the buoys in a manner of being in parallel to the buoys. Since the solar panels cannot always face the sun, the power generation efficiency is poor in the morning and evening. Alternatively, the solar power plant is mounted above the buoys by the use of support frames in a manner that the solar panels face the East with a tilt angle of 30-50 degrees. This will encounter problems such as shadowing due to the connection between the solar panels, directly affecting the overall power generation efficiency. Some countries have developed light concentrating water solar systems which may have complex mechanical configurations and factors adversely influencing the power generation efficiency such as rotation caused by the wind and water surface fluctuations.

No commercially available floating-on-water solar power system is effective to use the benefits of the surrounding water environment, but simply uses the water space to host itself. The water solar power system often needs to use fixed piles for positioning, and to set up maintenance trails in order to facilitate system maintenance. This causes shortages such as complexity in construction and increase in weight. Furthermore, all the solar panels are set horizontally or at a fixed tilt angle, failing to fully and effectively use sunshine resources of the full day, nor to take advantage of the features and benefits while being on the water.

The inventors have made long-term efforts in solving such a problem, and successfully got an approach to achieve a photovoltaic system which can overcome the problem encountered in the prior art.

SUMMARY OF THE INVENTION

A main purpose of this invention is to provide a photovoltaic system which can be located on the water surface, and has its floating mechanism to be under water by using the adjusting mechanism and the surrounding water source. The adjusting mechanism can be further used to adjust the solar power mechanism to a specific tilt angle according to the water level of the surrounding water and the sun-tracking angles that varies as the locations of the sun, so that the simplified configuration, accurate sun tracking and enhanced power generation efficiency can be achieved In order to achieve the above and other objectives, the photovoltaic system able to float on water and track sun includes a floating mechanism; an adjusting mechanism, combining with the floating mechanism; and a solar power mechanism, combining with the adjusting mechanism and located above the floating mechanism.

In one embodiment, the floating mechanism includes a support frame having a chamber, sleeves respectively located at each terminal of the support frame, an accommodating part on the support frame, and a lid covering the accommodating part.

In one embodiment, the support frame has a bottom with an arc face.

In one embodiment, the adjusting mechanism includes a control unit in the accommodating part, a valve connecting to the control unit and communicating with the chamber, buoys respectively located in the sleeves, and a plurality of pumps connecting to the control unit and communicating with each of the sleeves and buoys; and the solar power mechanism is mounted on each buoy.

In one embodiment, the solar power mechanism includes a carrier, at least one solar panel in the carrier, a power storage unit connecting to the solar panel and located in the accommodating part.

In one embodiment, a top of each buoy and a bottom of the carrier respectively have corresponding buckle ears which connects to each other by a connector.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
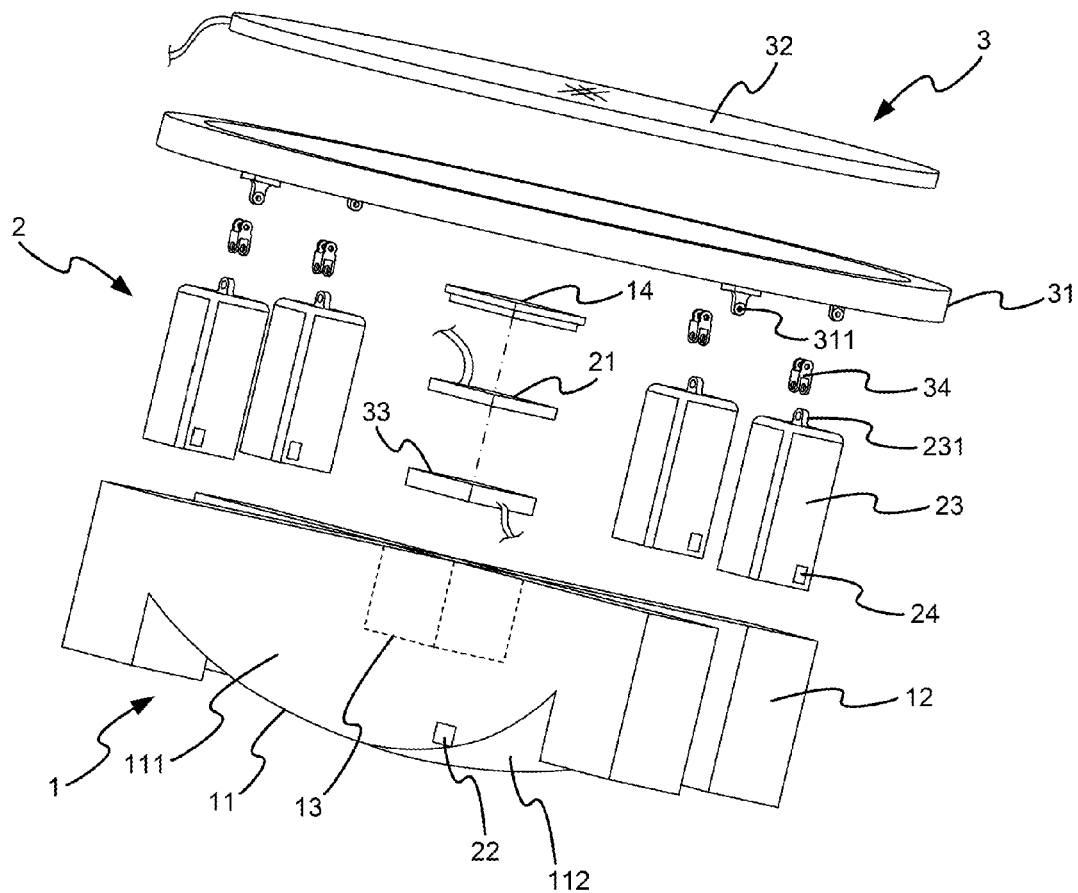
FIG. 1 is a schematic view of an appearance of a photovoltaic system able to float on water and track sun according to one embodiment of the invention.
Figure 2:
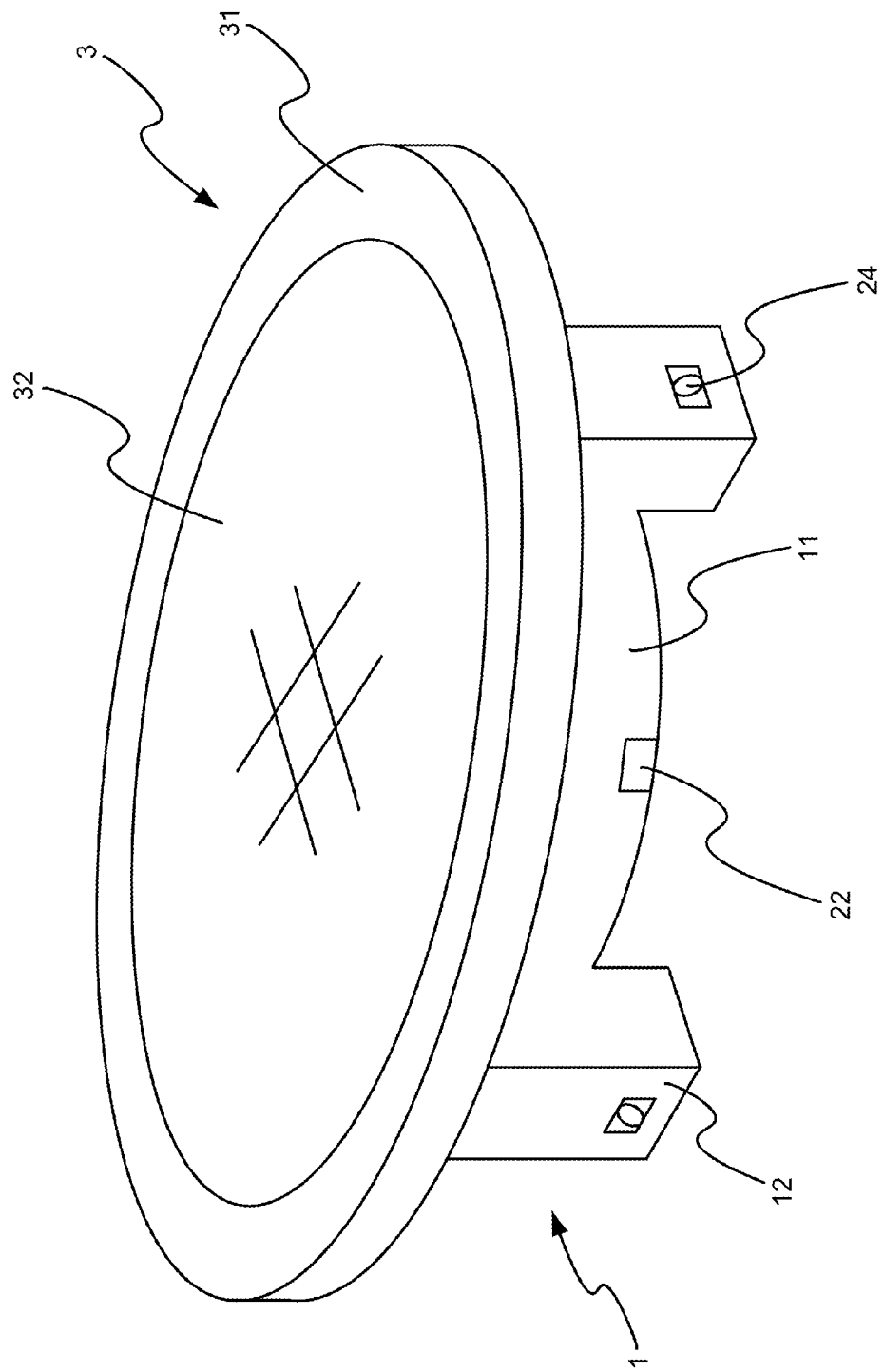
FIG. 2 is a schematic, exploded view of a photovoltaic system able to float on water and track sun according to one embodiment of the invention.
Figure 3:
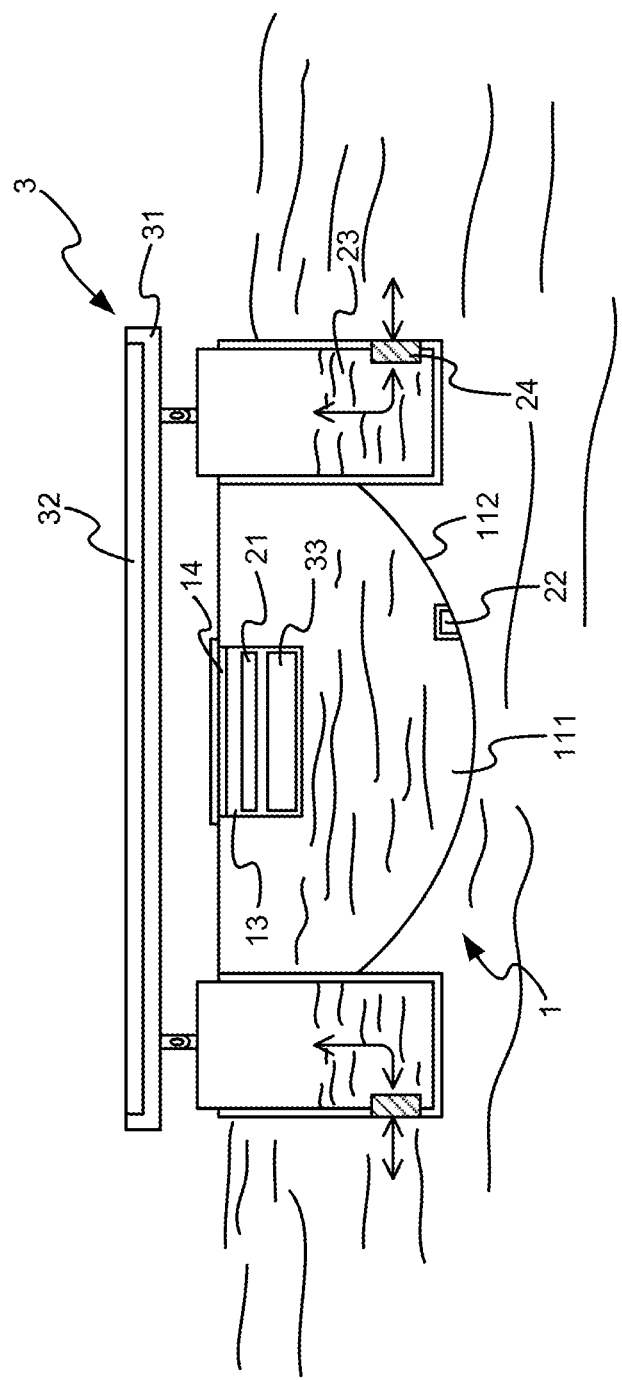
FIG. 3 is a schematic, cross-sectional view of use status of a photovoltaic system able to float on water and track sun according to one embodiment of the invention.

FIG. 1 is a schematic view of an appearance of a photovoltaic system able to float on water and track sun according to one embodiment of the invention. FIG. 2 is a schematic, exploded view of a photovoltaic system able to float on water and track sun according to one embodiment of the invention. FIG. 3 is a schematic, cross-sectional view of use status of a photovoltaic system able to float on water and track sun according to one embodiment of the invention. As shown, a photovoltaic system able to float on water and track sun according to the invention at least includes a floating mechanism 1, an adjusting mechanism 2 and a solar power mechanism 3.

The above floating mechanism 1 includes a support frame 11 having a chamber 111, sleeves 12 respectively located at each terminal of the support frame 11, an accommodating part 13 on the support frame 11, and a lid 14 covering the accommodating part 13. The support frame 11 has a bottom with an arc face 112.

The adjusting mechanism 2 combines with the floating mechanism 1, and includes a control unit 21 in the accommodating part 13, a valve 22 connecting to the control unit 21 and communicating with the chamber 111, buoys 23 respectively located in the sleeves 12, and a plurality of pumps 24 connecting to the control unit 21 and communicating with each of the sleeves 12 and buoys 23.

The solar power mechanism 3 is mounted on each buoy 23 of the adjusting mechanism 2 in a manner of being above the floating mechanism 1. The solar power mechanism 3 includes a carrier 31, at least one solar panel 32 in the carrier 31, a power storage unit 33 connecting to the solar panel 32 and located in the accommodating part 13. A top of each buoy 23 and a bottom of the carrier 31 respectively have corresponding buckle ears 231, 311. A connector 34 connects the corresponding buckle ears 231, 311. Thereby, the above structure constitutes a novel photovoltaic system able to float on water and track sun.

When the present invention is in use, place the floating mechanism 1 into the water, and then open the valve 22 of the adjusting mechanism 2 to allow the surrounding water source to enter into the chamber 111 of the support frame 11 as ballast water. The floating mechanism 1 is kept below a horizontal plane of the water to reduce the influence by the strong winds and streams. Furthermore, a stabilization effect can be achieved with the use of the arc face 112. When the water level in the chamber 111 is to be adjusted, the water level of the ballast water in the floating mechanism 1 can be adjusted based on the weights of the adjusting mechanism 2, the solar power mechanism 3 and other load materials. Furthermore, the buoyancy of the floating mechanism 1 and the water depth of the surrounding water contribute to automatically adjust the elevation of the photovoltaic system. Then according to season and timing, the surrounding water source is inhaled to the buoys 23 or discharged from the buoys 23 with the use of combination of the control unit 21 and each pump 24 so that the solar power mechanism 3 floats on the water in accordance with the required angles. The buoyancy of each buoy 23 is used to load the carrier 31 and the solar panels 32. Therefore, when the present invention is in use, the control unit 21 periodically controls the amount of water in each buoy 23 according to the season and timing so that the floating mechanism 1 is adjusted to the specific angle of tilt due to the different content of water in each buoy 23. Thereby the solar panels 32 of the solar power mechanism 3 are driven to the required angle of sun exposure in order to periodically and quantitatively control the water level in each buoy 23 by using the water buoyancy principle and the surrounding water source to form a predetermined tilt angle. The maximum tilt angle is set to from ±30 degrees to 50 degrees, beginning from morning and ending at evening. The overall system is in parallel to the water surface at noon. Since the solar panels are closest to the water surface, it is a good chance to dissipate heat due to lower temperature close to the water surface so as to enhance the performance of solar panels. Furthermore, multiple photovoltaic systems can be used in series or in parallel to form a large photovoltaic system able to float on water to track sunlight.

The present invention can make the best use of surrounding water resource to supply the support frame 11 and the buoys 23 with required water. With the use of the water buoyancy principle and the control of the water volume in each buoy 23, the floating mechanism is made to tilt and the solar panels 32 are driven to track the sun. On the other hand, a large area of water has lower temperature and more intensive reflection at its surface than the land surface. Therefore, when sunlight at noon shines directly on the solar panels of the photovoltaic system, the generated heat can be reduced as soon as the solar panels go close to the water surface and reduce their temperature. The reflection and refraction on the water contributes to increase the power generation efficiency of the solar panels. The arrangement of the control unit 21 and the power storage unit 33 inside the accommodating part 13 facilitates to meet the needs for replacement and maintenance.

In summary, the photovoltaic system able to float on water and track sun according to the present invention can effectively overcome the shortcomings in the prior art. The photovoltaic system can be located on the water surface, and has its floating mechanism to be under water by using the adjusting mechanism and the surrounding water source. The adjusting mechanism can be further used to adjust the solar power mechanism to a specific tilt angle according to the water level of the surrounding water and the sun-tracking angles that varies as the locations of the sun. Therefore, a novel photovoltaic system with simplified configuration, accurate sun tracking and enhanced power generation efficiency can be achieved. This makes the invention more progressive and more practical in use which complies with the patent law.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A photovoltaic system able to float on water and track the sun, comprising
a floating mechanism configured to float on water and comprising a chamber and four sleeves, each sleeve respectively arranged at one of four corners of the floating mechanism, wherein the chamber is configured to be partially flooded as ballast and buoyantly supported by the water;
an adjusting mechanism comprising:
a control unit,
a valve connected to the control unit and communicating with the chamber wherein the control unit selectively operates the valve to admit a selected amount of water to enter the chamber as ballast to achieve a desired buoyant elevation of the photovoltaic system and stabilize the floating mechanism parallel to a surface of the water, four buoys, each buoy arranged in a respective one of the sleeves, and four pumps with a respective pump in fluid communication with a respective each one of the sleeves and the buoys such that an amount of water ballast in each buoy can be selectively adjusted so as to change the buoyant support height of each buoy with respect to a corresponding corner of the floating mechanism and adjust a tilt angle of the adjusting mechanism with respect to the floating mechanism and the surface of the water; and a solar power mechanism located above the floating mechanism and mounted on the four buoys such that the solar power mechanism also tilts to the adjusted tilt angle with respect to the surface of the water and the floating mechanism.

2. The photovoltaic system of claim 1, wherein the floating mechanism further comprises a support frame having the chamber and sleeves, an accommodating part on the support frame, and a lid covering the accommodating part.

3. The photovoltaic system of claim 2, wherein the support frame has a bottom with an arc face.

4. The photovoltaic system of claim 1, wherein the solar power mechanism comprises a carrier, at least one solar panel in the carrier, and a power storage unit connecting to the solar panel.

5. The photovoltaic system of claim 4, wherein a top of each buoy and a bottom of the carrier respectively have corresponding buckle ears.

6. The photovoltaic system of claim 5, further comprising connectors connecting corresponding buckle ears.

* * * * *